US011893678B2

(12) United States Patent
Kwon et al.

(10) Patent No.: US 11,893,678 B2
(45) Date of Patent: Feb. 6, 2024

(54) APPARATUS AND METHOD FOR SEARCHING FOR GLOBAL MINIMUM OF POINT CLOUD REGISTRATION ERROR

(71) Applicant: ELECTRONICS AND TELECOMMUNICATIONS RESEARCH INSTITUTE, Daejeon (KR)

(72) Inventors: Hyuk-Min Kwon, Daejeon (KR); Hyun-Cheol Kim, Sejong-si (KR); Jeong-Il Seo, Daejeon (KR); Sang-Woo Ahn, Daejeon (KR); Seung-Jun Yang, Sejong-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 117 days.

(21) Appl. No.: 17/583,691

(22) Filed: Jan. 25, 2022

(65) Prior Publication Data
US 2022/0254095 A1    Aug. 11, 2022

(30) Foreign Application Priority Data
Feb. 3, 2021    (KR) .................. 10-2021-0015602

(51) Int. Cl.
*G06T 15/08* (2011.01)
*G06T 15/10* (2011.01)
(52) U.S. Cl.
CPC .............. *G06T 15/08* (2013.01); *G06T 15/10* (2013.01); *G06T 2210/56* (2013.01)

(58) Field of Classification Search
None
See application file for complete search history.

(56) References Cited

U.S. PATENT DOCUMENTS

| 10,360,469 | B2 | 7/2019 | Feng et al. |
| 2009/0298476 | A1 | 12/2009 | Choi et al. |
| 2015/0254857 | A1 | 9/2015 | Huang et al. |
| 2019/0205695 | A1 | 7/2019 | Yan et al. |
| 2022/0361736 | A1* | 11/2022 | Danna ................ A61B 1/00158 |

FOREIGN PATENT DOCUMENTS

| KR | 10-2009-0123342 | 12/2009 |
| KR | 10-2016-0088226 | 7/2016 |
| KR | 10-2016-0149848 | 12/2016 |

* cited by examiner

*Primary Examiner* — Nurun Flora
(74) *Attorney, Agent, or Firm* — KILE PARK REED & HOUTTEMAN PLLC

(57) ABSTRACT

Disclosed herein are an apparatus and method for searching for a global minimum of a point cloud registration error. The apparatus includes memory in which at least one program is recorded and a processor for executing the program. The program performs collecting multiple registration results in which the registration error between a source point cloud and a target point cloud is a local minimum as candidates and selecting the registration result in which the registration error between the source point cloud and the target point cloud is a global minimum, among the candidates. Collecting the multiple registration results may comprise repeatedly randomly initializing the source point cloud and the target point cloud and registering the initialized source point cloud to the initialized target point cloud to thereby search for a registration result in which the registration error therebetween is a local minimum.

17 Claims, 8 Drawing Sheets

APPARATUS AND METHOD FOR SEARCHING FOR GLOBAL MINIMUM OF POINT CLOUD REGISTRATION ERROR

CROSS REFERENCE TO RELATED APPLICATION

This application claims the benefit of Korean Patent Application No. 10-2021-0015602, filed Feb. 3, 2021, which is hereby incorporated by reference in its entirety into this application.

BACKGROUND OF THE INVENTION

1. Technical Field

The disclosed embodiment relates to technology for registering multiple 3D point clouds.

2. Description of the Related Art

When a 3D point cloud for a certain object, environment, or space is acquired, data pertaining thereto is acquired from different positions in order to acquire more precise data without loss. Here, because the center of a sensor in each of the positions becomes the origin point of the data, when pieces of data acquired from the different positions are merged into a single coordinate system without change, a desired data form is not acquired.

The most representative method for solving this problem is an Iterative Closest Point (ICP) algorithm, which repeatedly performs processes of matching the closest points between the two point clouds to be registered and searching for a transformation matrix for minimizing the mean distance therebetween, that is, a registration error.

However, a general ICP algorithm has a significant disadvantage in that, in practice, a registration error converging to a local minimum, rather than a global minimum, is found depending on the starting positions input thereto.

SUMMARY OF THE INVENTION

An object of the disclosed embodiment is to search for a registration result corresponding to a global minimum of a registration error, rather than a local minimum thereof, when multiple 3D point clouds are registered.

An apparatus for searching for a global minimum of a point cloud registration error according to an embodiment includes memory in which at least one program is recorded and a processor for executing the program, and the program may perform collecting multiple registration results in which the registration error between a source point cloud and a target point cloud is a local minimum as candidates and selecting the registration result in which the registration error between the source point cloud and the target point cloud is a global minimum, among the candidates. Collecting the multiple registration results may comprise repeatedly performing randomly initializing the source point cloud and the target point cloud and registering the initialized source point cloud to the initialized target point cloud to thereby search for a registration result in which the registration error is a local minimum.

Here, the source point cloud and the target point cloud may be configured such that the center of points included in the source point cloud and the center of points included in the target point cloud are moved to an origin point.

Here, the target point cloud may be generated as a multi-dimensional tree (KD-tree).

Here, the program may further perform segmenting each of the target point cloud and the source point cloud into predetermined voxel units, calculating normal vectors for respective voxels, and calculating multiple first transformation matrices for matching the normal vectors of the target point cloud to the respective normal vectors of the source point cloud. Collecting the multiple registration results may comprise initializing the source point cloud and the target point cloud based on one of the multiple first transformation matrices.

Here, searching for the registration result may include matching at least one point in the target point cloud to a point closest thereto in the source point cloud, performing rigid transformation of the source point cloud based on the matched closest points, and calculating the registration error between the target point cloud and the source point cloud on which rigid transformation is performed. Matching the closest points, performing the rigid transformation, and calculating the registration error may be repeatedly performed until the registration error converges to a local minimum, and a second transformation matrix by which the registration error converges to the local minimum may be added to the candidates.

Here, collecting the multiple registration results may be repeatedly performed depending on whether predetermined conditions for termination are satisfied, and whether the predetermined conditions for termination are satisfied may be determined depending on whether a termination condition, calculated by setting the difference between the maximum value and the mean value of degrees of matching as a multiple of a variance, is equal to or greater than a predetermined threshold after calculating the degrees of matching between the source point cloud and the target point cloud registered by respective multiple second transformation matrices.

Here, the degrees of matching may be calculated by applying the number of matching points between the source point cloud and the target point cloud to the mean of distances between the matching points as a weight.

Here, whether the predetermined conditions for termination are satisfied may be determined when three or more second transformation matrices are collected.

A method for searching for a global minimum of a point cloud registration error according to an embodiment includes collecting multiple registration results in which the registration error between a source point cloud and a target point cloud is a local minimum as candidates and selecting the registration result in which the registration error between the source point cloud and the target point cloud is a global minimum, among the candidates. Collecting the multiple registration results may comprise repeatedly performing randomly initializing the source point cloud and the target point cloud and registering the initialized source point cloud to the initialized target point cloud to thereby search for a registration result in which the registration error is a local minimum.

Here, the source point cloud and the target point cloud may be configured such that the center of points included in the source point cloud and the center of points included in the target point cloud are moved to an origin point.

Here, the target point cloud may be generated as a multi-dimensional tree (KD-tree).

Here, the method may further include segmenting each of the target point cloud and the source point cloud into predetermined voxel units, calculating normal vectors for respective voxels, and calculating multiple first transformation matrices for matching the normal vectors of the target point cloud to the respective normal vectors of the source point cloud. Collecting the multiple registration results may comprise initializing the source point cloud and the target point cloud based on one of the multiple first transformation matrices.

Here, searching for the registration result may include matching at least one point in the target point cloud to a point closest thereto in the source point cloud, performing rigid transformation of the source point cloud based on the matched closest points, and calculating the registration error between the target point cloud and the source point cloud on which rigid transformation is performed. Matching the closest points, performing the rigid transformation, and calculating the registration error may be repeatedly performed until the registration error converges to a local minimum, and a second transformation matrix by which the registration error converges to the local minimum may be added to the candidates.

Here, collecting the multiple registration results may be repeatedly performed depending on whether predetermined conditions for termination are satisfied, and whether the predetermined conditions for termination are satisfied may be determined depending on whether a termination condition, calculated by setting the difference between the maximum value and the mean value of degrees of matching as a multiple of a variance, is equal to or greater than a predetermined threshold after calculating the degrees of matching between the source point cloud and the target point cloud registered by respective multiple second transformation matrices.

Here, the degrees of matching may be calculated by applying the number of matching points between the source point cloud and the target point cloud to the mean of distances between the matching points as a weight.

Here, whether the predetermined conditions for termination are satisfied may be determined when three or more second transformation matrices are collected.

A method for searching for a global minimum of a point cloud registration error according to an embodiment may include calculating multiple first transformation matrices for randomly transforming a source point cloud and a target point cloud, initializing the source point cloud and the target point cloud based on a first one of the multiple first transformation matrices, searching for a first registration result that makes the registration error between the initialized source point cloud and the initialized target point cloud converge to a local minimum, adding the found first registration result to candidates, initializing the source point cloud and the target point cloud based on a second one of the multiple first transformation matrices, searching for a second registration result that makes the registration error between the initialized source point cloud and the initialized target point cloud converge to a local minimum, adding the found second registration result to the candidates, initializing the source point cloud and the target point cloud based on a third one of the multiple first transformation matrices, searching for a third registration result that makes the registration error between the initialized source point cloud and the initialized target point cloud converge to a local minimum, adding the found third registration result to the candidates, and returning to initializing the source point cloud and the target point cloud based on a fourth one of the multiple first transformation matrices or selecting the registration result in which the registration error between the source point cloud and the target point cloud is a global minimum, among the candidates, depending on whether predetermined conditions for termination are satisfied.

Here, calculating the multiple first transformation matrices may include segmenting each of the target point cloud and the source point cloud into predetermined voxel units, calculating normal vectors for respective voxels, and calculating multiple first transformation matrices for matching the normal vectors of the target point cloud to the respective normal vectors of the source point cloud.

Here, whether the predetermined conditions for termination are satisfied may be determined depending on whether a termination condition, calculated by setting the difference between the maximum value and the mean value of degrees of matching as a multiple of a variance, is equal to or greater than a predetermined threshold after calculating the degrees of matching between the source point cloud and the target point cloud registered by the respective multiple second transformation matrices.

Here, the degrees of matching may be calculated by applying the number of matching points between the source point cloud and the target point cloud to the mean of distances between the matching points as a weight.

BRIEF DESCRIPTION OF THE DRAWINGS

The above and other objects, features, and advantages of the present invention will be more clearly understood from the following detailed description taken in conjunction with the accompanying drawings, in which.

DESCRIPTION OF THE PREFERRED EMBODIMENTS

Figure 1:
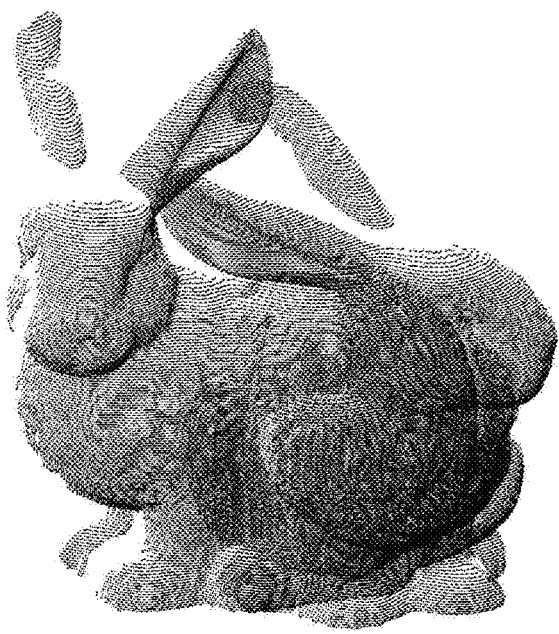
FIG. 1 is an exemplary view illustrating registration of 3D point clouds for the same object acquired from different positions.

The advantages and features of the present invention and methods of achieving the same will be apparent from the exemplary embodiments to be described below in more detail with reference to the accompanying drawings. However, it should be noted that the present invention is not limited to the following exemplary embodiments, and may be implemented in various forms. Accordingly, the exemplary embodiments are provided only to disclose the present invention and to let those skilled in the art know the category of the present invention, and the present invention is to be defined based only on the claims. The same reference numerals or the same reference designators denote the same elements throughout the specification.

It will be understood that, although the terms "first," "second," etc. may be used herein to describe various elements, these elements are not intended to be limited by these terms. These terms are only used to distinguish one element from another element. For example, a first element discussed below could be referred to as a second element without departing from the technical spirit of the present invention.

The terms used herein are for the purpose of describing particular embodiments only, and are not intended to limit the present invention. As used herein, the singular forms are intended to include the plural forms as well, unless the context clearly indicates otherwise. It will be further understood that the terms "comprises," "comprising,", "includes" and/or "including," when used herein, specify the presence of stated features, integers, steps, operations, elements, and/or components, but do not preclude the presence or addition of one or more other features, integers, steps, operations, elements, components, and/or groups thereof.

Unless differently defined, all terms used herein, including technical or scientific terms, have the same meanings as terms generally understood by those skilled in the art to which the present invention pertains. Terms identical to those defined in generally used dictionaries should be interpreted as having meanings identical to contextual meanings of the related art, and are not to be interpreted as having ideal or excessively formal meanings unless they are definitively defined in the present specification.

Hereinafter, an apparatus and method for searching for a global minimum of a point cloud registration error according to an embodiment will be described in detail with reference to FIGS. 1 to 10.

Figure 2:
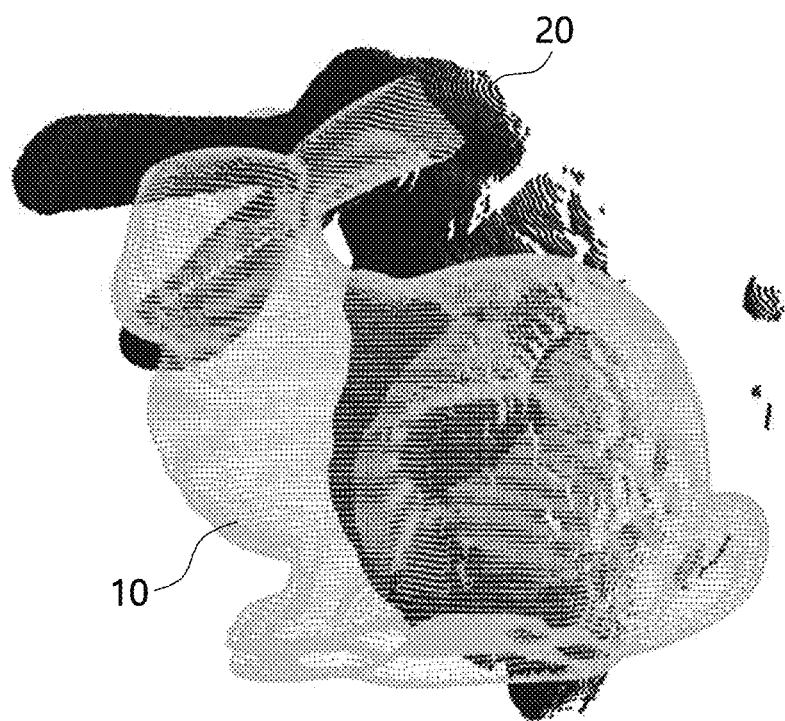
FIG. 2 is an exemplary view of point clouds before registration according to an embodiment.
Figure 3:
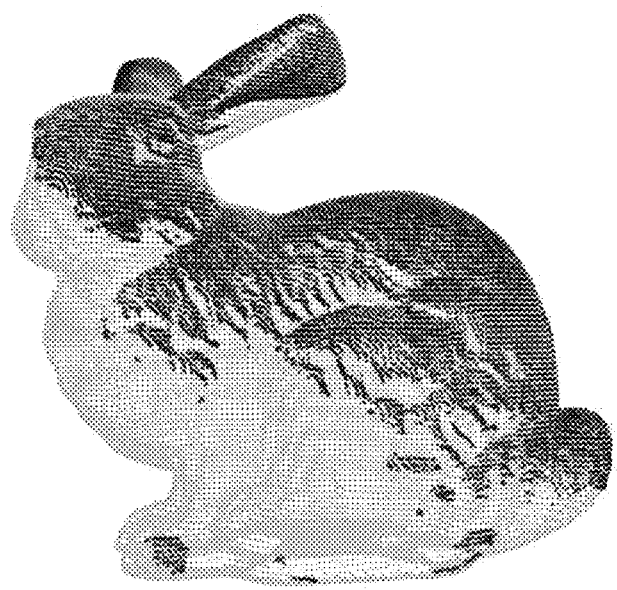
FIG. 3 is an exemplary view of point clouds after registration according to an embodiment.

FIG. 1 is an exemplary view illustrating registration of 3D point clouds for the same object acquired from different positions, FIG. 2 is an exemplary view of point clouds before registration according to an embodiment, and FIG. 3 is an exemplary view of point clouds after registration according to an embodiment.

When a 3D point cloud for an object, a space, or an environment is acquired, it is necessary to change the position of a sensor and acquire data from different positions and directions in order to acquire dense data without loss. All point clouds acquired from respective positions are disposed in coordinate systems in which the origin point thereof is set to the center of the sensor. When these point clouds are merged into a single coordinate system without change, meaningless data may be generated, as shown in FIG. 1.

Accordingly, it is necessary to register point clouds such that the shape of an object, a space, or an environment, which is the target to be sensed, is represented well.

Here, registration indicates the process in which point clouds 10 and 20 acquired for the same object (i.e., the same rabbit) are respectively set as a target point cloud 10 and a source point cloud 20, as shown in FIG. 2, and the source point cloud 20 is transformed so as to overlap the target point cloud 10, as shown in FIG. 3.

As a method for registration, an Iterative Closest Point (ICP) algorithm is widely used at present.

The ICP algorithm matches the closest points between a target point cloud 10 and a source point cloud 20 and performs rigid transformation on the source point cloud 20 based on the matched closest points, thereby searching for the relationship between the poses of the two point clouds. That is, because there is no information about corresponding points between the target point cloud 10 and the source point cloud 20, rigid transformation is performed based on the closest points.

Also, the ICP algorithm repeatedly performs matching of the closest points and rigid transformation until the registration error between the target point cloud 10 and the source point cloud 20 converges. However, the value to which the registration error converges may vary depending on the initial values of the target point cloud 10 and the source point cloud 20. That is, the value to which the registration error is made to converge by the ICP algorithm is useful for searching for a local minimum, but is not appropriate for searching for a global minimum.

Accordingly, in an embodiment, an apparatus and method for improving the performance of registration of point clouds by searching for a global minimum, rather than a local minimum, are proposed in order to overcome the limitations of the ICP algorithm.

That is, in order to forcibly escape from the situation in which the registration error between a source point cloud and a target point cloud converges to a local minimum, an embodiment is configured to repeatedly and randomly change the initial values of the source point cloud and the target point cloud, to collect candidates for registration results in which the registration error acquired by an ICP algorithm converges to a local minimum whenever the initial values are randomly changed, and to search the candidates for a registration result in which the registration error converges to a global minimum.

Figure 4:
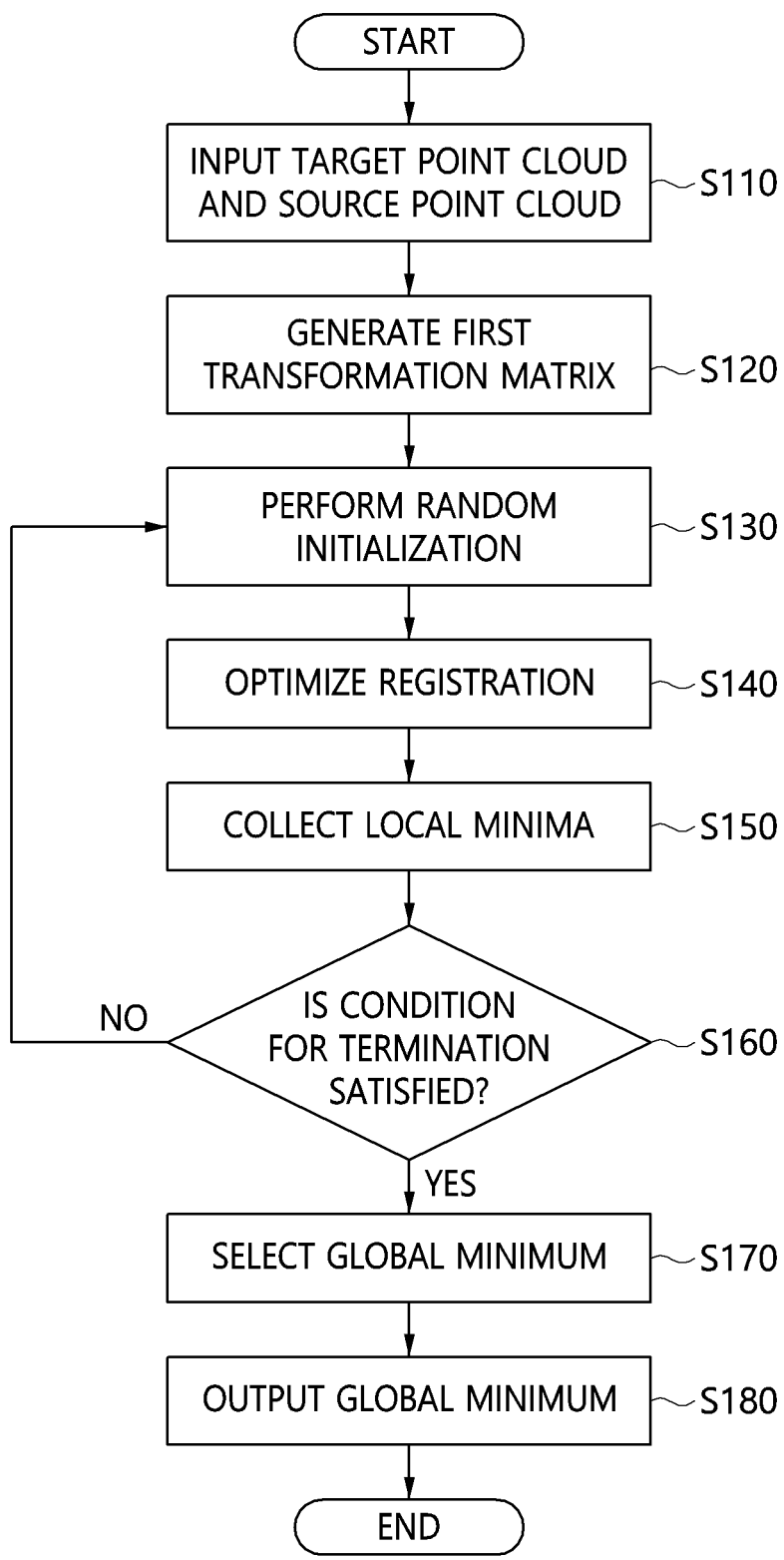
FIG. 4 is a flowchart for explaining a method for searching for a global minimum of a point cloud registration error according to an embodiment.
Figure 5:
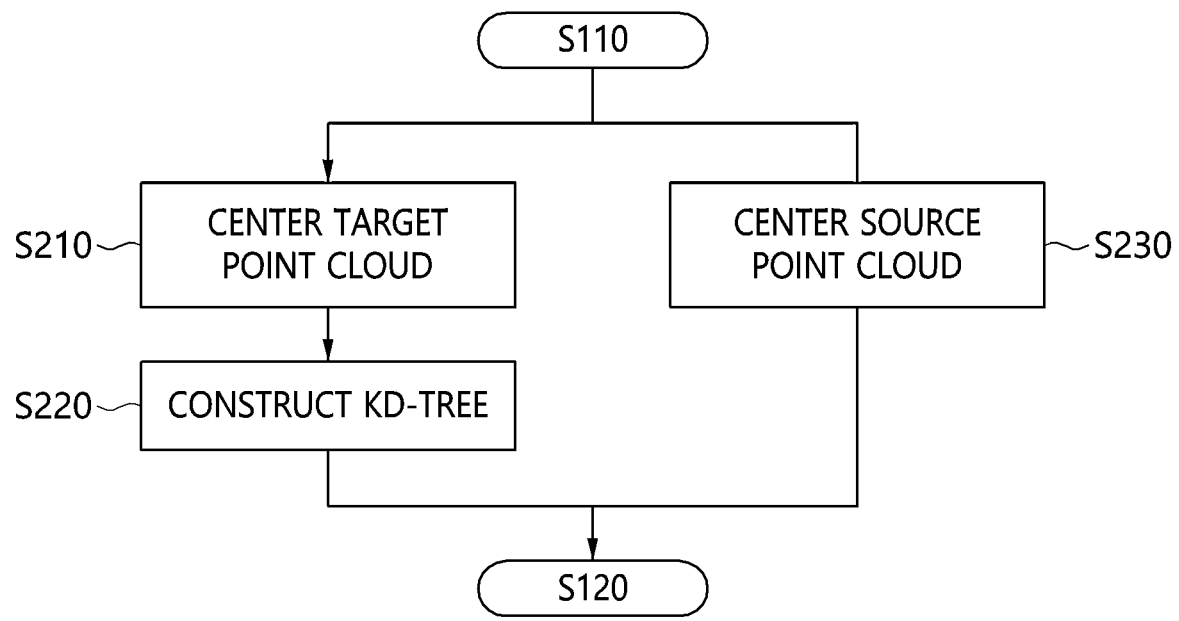
FIG. 5 is a flowchart for explaining the step of centering a point cloud according to an embodiment.
Figure 6:
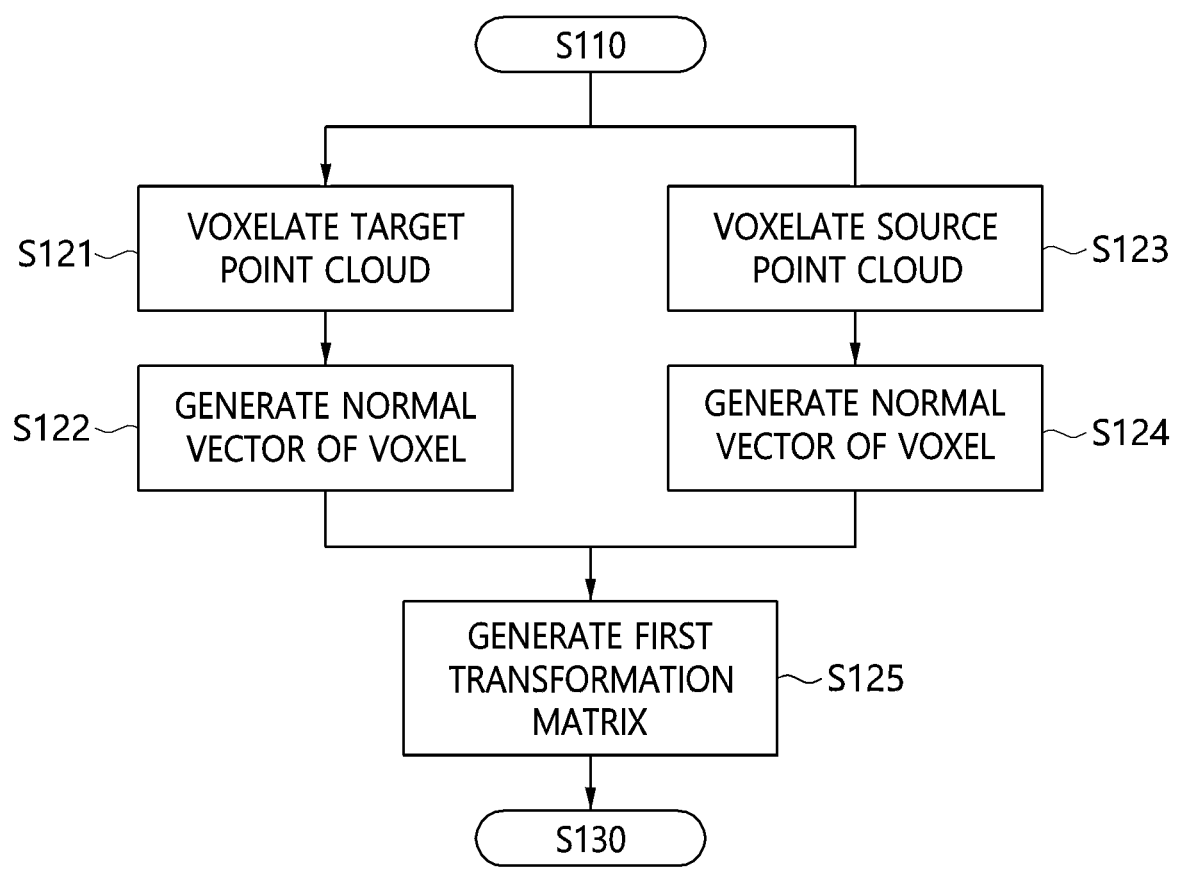
FIG. 6 is a flowchart for explaining the step of generating a first transformation matrix illustrated in FIG. 4.
Figure 7:
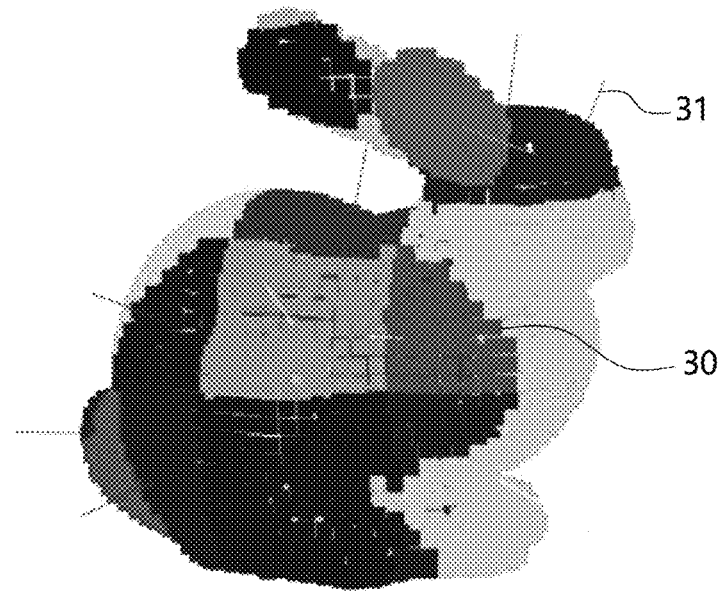
FIG. 7 is an exemplary view of a voxelated point cloud according to an embodiment.
Figure 8:
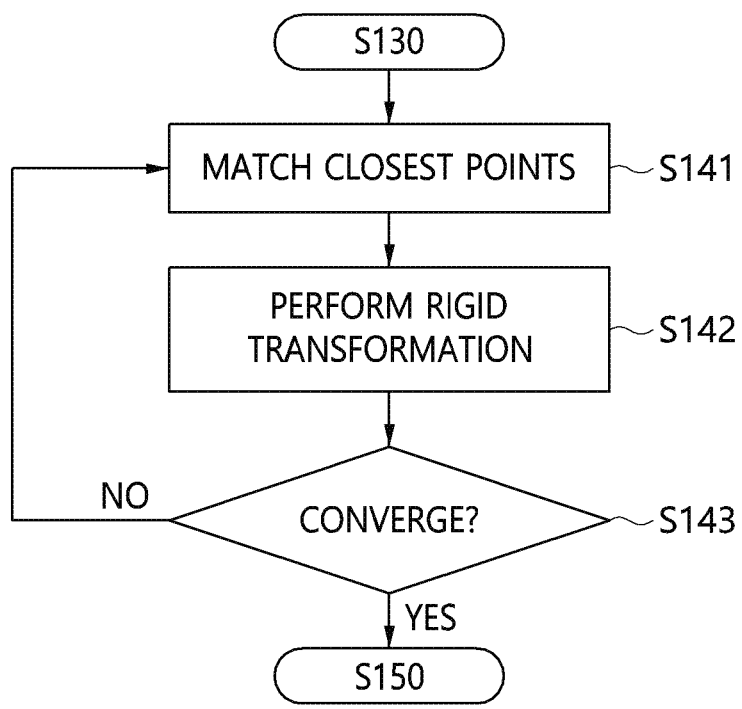
FIG. 8 is a flowchart for explaining the step of optimizing registration illustrated in FIG. 4.
Figure 9:
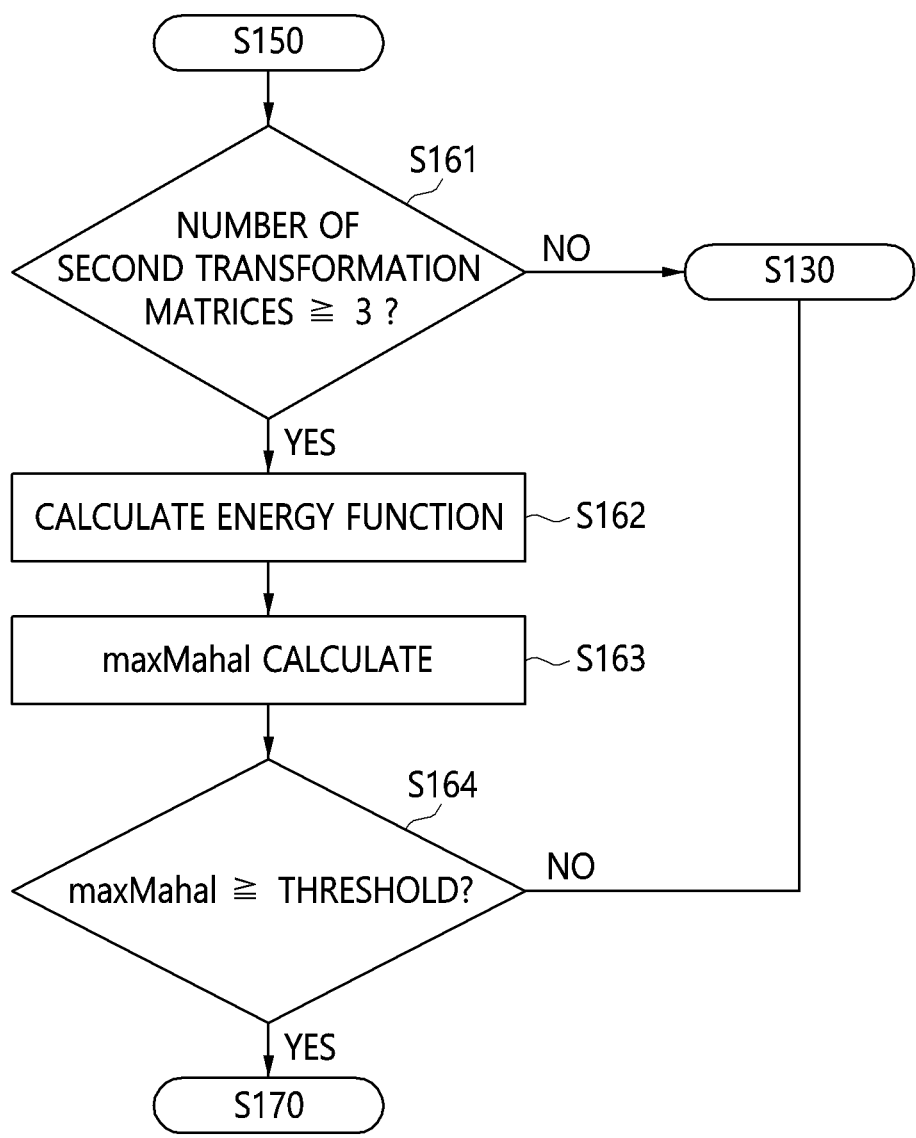
FIG. 9 is a flowchart for explaining the step of determining whether conditions for termination are satisfied, illustrated in FIG. 4.

FIG. 4 is a flowchart for explaining a method for searching for a global minimum of a point cloud registration error according to an embodiment, FIG. 5 is a flowchart for explaining the step of centering a point cloud according to an embodiment, FIG. 6 is a flowchart for explaining the step (S120) of generating a first transformation matrix, illustrated in FIG. 4, FIG. 7 is an exemplary view of a voxelated point cloud according to an embodiment, FIG. 8 is a flowchart for explaining the step (S140) of optimizing registration, illustrated in FIG. 4, and FIG. 9 is a flowchart for explaining the step (S160) of determining whether conditions for termination are satisfied, illustrated in FIG. 4.

Referring to FIG. 4, the method for searching for a global minimum of a point cloud registration error according to an embodiment may include collecting multiple registration results in which the registration error between a source point cloud and a target point cloud is a local minimum as candidates at steps S110 to S160 and selecting the registration result in which the registration error between the source point cloud and the target point cloud is a global minimum, among the multiple registration results included in the candidates, at step S170.

Here, in the steps (S110 to S160) of collecting the multiple registration results, randomly initializing the source point cloud and the target point cloud at steps S120 to S130 and registering the initialized source point cloud to the initialized target point cloud to thereby search for a registration result in which the registration error is a local minimum at steps S140 to S150 may be repeatedly performed at step S160.

Here, the target point cloud and the source point cloud that are input at step S110 may be data pertaining to the same single object and acquired by respective sensors located at different positions.

However, this is merely an embodiment, and the present invention is not limited thereto. That is, the present invention may also be applied to registration of point clouds acquired for different objects, as well as point clouds acquired for the same single object. For example, the present invention may also be applied in order to generate the shape of a new object by registering point clouds acquired for different objects having similar shapes.

Here, the steps illustrated in FIG. 5 may be additionally performed between steps S110 and S120 in FIG. 4 in the method for searching for a global minimum of a point cloud registration error according to an embodiment.

That is, referring to FIG. 5, each of the source point cloud and the target point cloud may be centered at steps S210 and S230.

Here, centering may be movement of the center of points included in the source point cloud and the center of points included in the target point cloud to the origin point.

Here, the center may be calculated as the mean coordinates of the 3D coordinates of all points included in a single point cloud.

Additionally, the target point cloud may be reconstructed as a multi-dimensional tree (KD-tree) at step S220.

Here, the KD-tree is a binary search tree in which data is extended to multiple dimensions, that is, k dimensions, and in an embodiment, the points of a point cloud are indexed in the form of a tree. Accordingly, the points included in the source point cloud and the points closest thereto in the target point cloud may be quickly searched for.

Meanwhile, in the method for searching for a global minimum of a point cloud registration error according to an embodiment, the step (S120) of generating a first transformation matrix, illustrated in FIG. 6, may be performed in order to randomly initialize the source point cloud and the target point cloud at step S130.

Referring to FIG. 6, first, each of the target point cloud and the source point cloud is voxelated to predetermined units at steps S121 and S123.

Here, a voxel may be a cube having edges of a fixed length L, and may be the unit by which each of the 3D target point cloud and the 3D source point cloud is segmented. For example, each of the target point cloud and the source point cloud may be segmented into voxels 30, as shown in FIG. 7.

Subsequently, normal vectors for the respective voxels are generated at steps S122 and S124. For example, referring to FIG. 7, a normal vector 31 for a voxel is marked with a solid line.

Here, a normal vector may be generated through Principal Component Analysis (PCA) of points present in a voxel.

Here, when the number of voxels of the target point cloud is N and when the number of voxels of the source point cloud is M, the number of normal vectors of the target point cloud and the number of normal vectors of the source point cloud may be N and M, respectively.

Subsequently, multiple first transformation matrices are generated at step S125 based on the generated normal vectors of the target point cloud and the generated normal vectors of the source point cloud.

Here, the first transformation matrices may be pseudo-random transformation matrices that make the normal vectors of the source point cloud respectively match the normal vectors of the target point cloud.

Here, each of the first transformation matrices may be a 4×4 matrix that represents pose information including information about the position and rotation of a sensor.

Also, when the number of normal vectors of the target point cloud is N and when the number of normal vectors of the source point cloud is M, the number of transformation matrices may be M×N.

Accordingly, the source point cloud and the target point cloud may be initialized based on one of the multiple first transformation matrices at the step (S130) of randomly initializing the source point cloud and the target point cloud, illustrated in FIG. 2. That is, after the point clouds are translated or rotated, an ICP algorithm may be applied thereto.

Here, when one of the first transformation matrices is selected for initialization, a first transformation matrix generated based on the normal vector of a voxel having a large number of points therein may be preferentially selected.

Meanwhile, in the method for searching for a global minimum of a point cloud registration error according to an embodiment, the steps illustrated in FIG. 8 may be performed as sub-steps of the step (S140) of registering the initialized source point cloud to the initialized target point cloud and thereby searching for a registration result in which the registration error therebetween is a local minimum.

Referring to FIG. 8, at least one point in the target point cloud is matched to the point closest thereto in the source point cloud at step S141.

Subsequently, rigid transformation of the source point cloud is performed based on the matched closest points at step S142. That is, the source point cloud is moved such that the matched closest points come closer to each other.

Subsequently, the registration error between the target point cloud and the source point cloud on which rigid transformation is performed is calculated, whether the calculated registration error converges is determined at step S143, and steps S141 and S142 are repeatedly performed until the registration error converges to a local minimum.

Here, the registration error may be calculated based on the mean of the distances between the points of the target point cloud and the points of the source point cloud on which rigid transformation is performed. That is, the smaller the mean of the distances, the better the registration between the two point clouds is performed. Therefore, when registration is optimized to a certain degree, the registration error converges to a fixed local minimum.

When it is determined at step S143 that the registration error converges to a local minimum, the process goes to step S150 in FIG. 4, whereby a registration result obtained by a second transformation matrix that makes the registration error converge to the local minimum may be added to the candidates.

In the step (S150) of collecting local minima corresponding to the randomly changed initialization values according to an embodiment, the registration result obtained by the second transformation matrix that makes the registration error converge is added to the candidates for a local minimum at step S150.

Meanwhile, as illustrated in FIG. 4, the steps (S130 to S150) of collecting multiple registration results in which the registration error between the source point cloud and the target point cloud is a local minimum as candidates may be repeatedly performed depending on whether predetermined conditions for termination are satisfied at step S160.

Here, whether the predetermined conditions for termination are satisfied may be determined through the steps illustrated in FIG. 9.

Here, whether the predetermined conditions for termination are satisfied may be determined when three or more second transformation matrices are collected.

That is, referring to FIG. 9, when it is determined at step S161 that the number of collected second transformation matrices is less than three, the process goes to step S130, whereby an additional second transformation matrix is searched for.

Conversely, when it is determined at step S161 that the number of collected second transformation matrices is equal to or greater than three, the degree of matching between the source point cloud and the target point cloud, which are registered by each of the collected multiple second transformation matrices, is calculated at step S162.

Here, the degree of matching may be defined as an energy function calculated as shown in Equation (1) below:

$$E = N_{matched} * e^{-mean(dist)} \qquad (1)$$

In Equation (1), E denotes the value of the energy function, mean(dist) is the mean distance between matching points, and $N_{matched}$ is the number of matching points between the target point cloud and the source point cloud.

Generally, the degree of matching is determined to be in proportion to the energy function calculated using only mean(dist), which is the mean distance between the matching points of the target point cloud and the source point cloud. However, when only the mean distance is used, the energy function is sometimes unable to reflect the actual degree of matching. For example, an error in which the energy function calculated in the state in which the point clouds are registered as shown in FIG. 2 is greater than the energy function calculated in the state in which the point clouds are registered as shown in FIG. 3 may occur.

Accordingly, unlike the conventional method, the energy function according to an embodiment may be calculated by applying $N_{matched}$, which is the number of matching points between the source point cloud and the target point cloud, to mean(dist), which is the mean distance between the matching points, as a weight.

Subsequently, whether the predetermined conditions for termination are satisfied may be determined depending on whether a termination condition value, calculated by setting the difference between the maximum value and the mean value of the calculated degrees of matching as a multiple of variance, is equal to or greater than a predetermined threshold at step S163.

First, the termination condition value maxMahal may be defined by Equation (2) below:

$$maxMahal = \sqrt{\frac{(max(E) - mean(E))^2}{variance(E)}} \qquad (2)$$

In Equation (2), max(E) denotes the maximum value of the values of the energy function E for the respective candidates, mean(E) denotes the mean value of the values of the energy function E for the respective candidates, and variance(E) denotes the variance of the values of the energy function E for the respective candidates.

The value of maxMahal calculated according to an embodiment always falls within a fixed range even if the shape, density, or unit of a point cloud is changed. Accordingly, there is an advantage that the value may be easily used for setting conditions for termination based on maxMahal. This is because the condition for termination is not set based on the maximum value max(E) of the values of the energy function E and because the difference between the mean value mean(E) and the maximum value max(E) is represented as a multiple of the variance, as shown in Equation (2).

Subsequently, whether the conditions for termination are satisfied may be determined at step S164 depending on whether the defined value of maxMahal, which is calculated at step S163, is equal to or greater than the predetermined threshold. Depending on the determination as to whether the conditions for termination are satisfied at step S164, step S130 or S170 in FIG. 4 may be selectively performed.

Referring again to FIG. 4, the registration result in which the registration error between the source point cloud and the target point cloud is a global minimum is selected, among the multiple registration results included in the collected candidates, at step S170. That is, the registration result that maximize the value of the energy function E, calculated by Equation (1), may be selected.

Subsequently, although not illustrated in the drawings, the selected registration result is refined through a convergence process by an ICP algorithm, and is then output at step S180.

Figure 10:
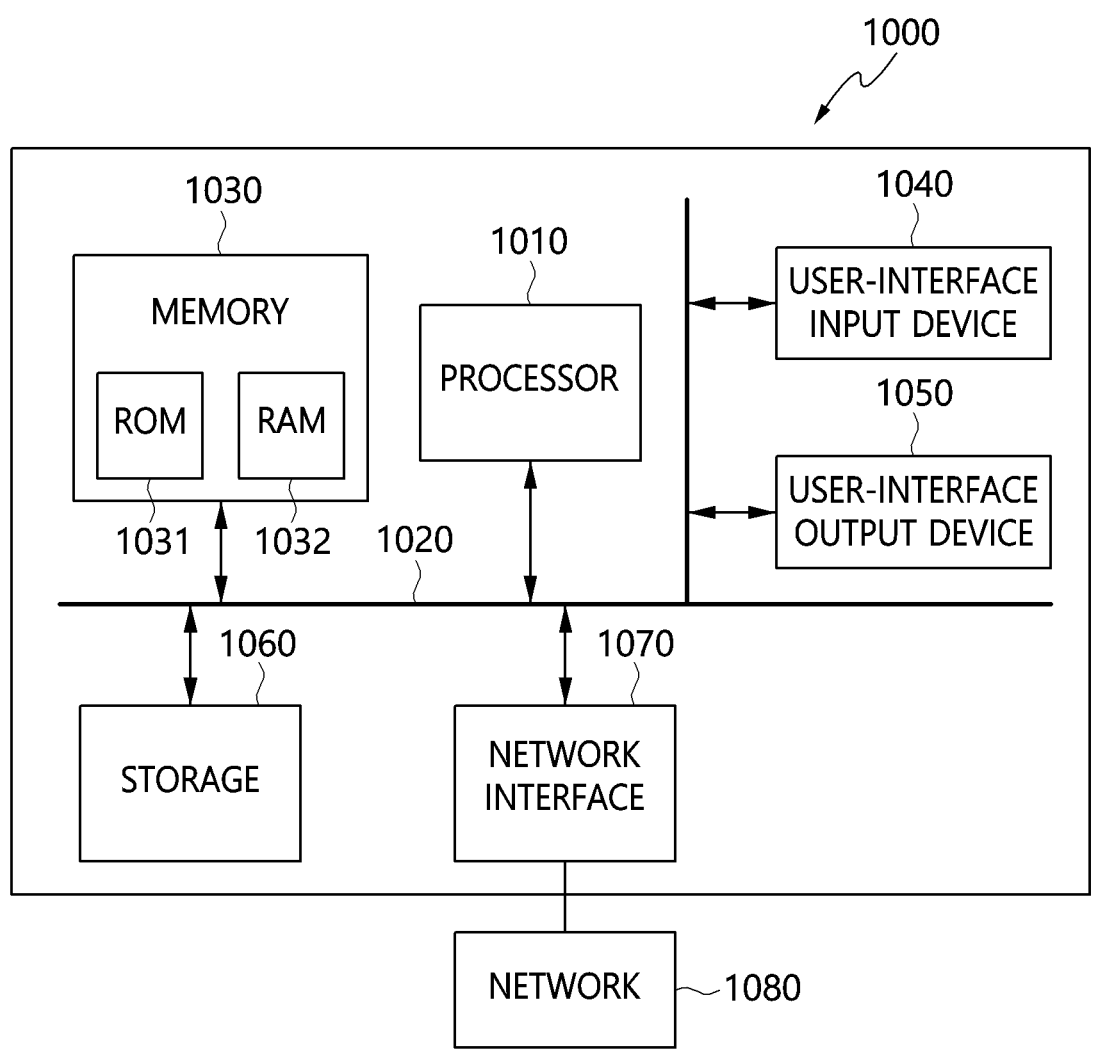
FIG. 10 is a view illustrating a computer system configuration according to an embodiment.

FIG. 10 is a view illustrating a computer system configuration according to an embodiment.

The apparatus for searching for a global minimum of a point cloud registration error according to an embodiment may be implemented in a computer system 1000 including a computer-readable recording medium.

The computer system 1000 may include one or more processors 1010, memory 1030, a user-interface input device 1040, a user-interface output device 1050, and storage 1060, which communicate with each other via a bus 1020. Also, the computer system 1000 may further include a network interface 1070 connected to a network 1080. The processor 1010 may be a central processing unit or a semiconductor device for executing a program or processing instructions stored in the memory 1030 or the storage 1060. The memory 1030 and the storage 1060 may be storage media including at least one of a volatile medium, a non-volatile medium, a detachable medium, a non-detachable medium, a communication medium, and an information delivery medium. For example, the memory 1030 may include ROM 1031 or RAM 1032.

According to an embodiment, when multiple 3D point clouds are registered, a registration result corresponding to a global minimum of a registration error, rather than a local minimum, is searched for, whereby the degree of matching between the multiple 3D point clouds may be improved.

Although embodiments of the present invention have been described with reference to the accompanying drawings, those skilled in the art will appreciate that the present invention may be practiced in other specific forms without changing the technical spirit or essential features of the present invention. Therefore, the embodiments described above are illustrative in all aspects and should not be understood as limiting the present invention.

What is claimed is:

1. An apparatus for searching for a global minimum of a point cloud registration error, comprising:
   memory in which at least one program is recorded; and
   a processor for executing the program,
   wherein:
   the program performs
   segmenting each of the target point cloud and the source point cloud into predetermined voxel units;
   calculating normal vectors for respective voxels;
   calculating multiple first transformation matrices for matching normal vectors of the target point cloud to respective normal vectors of the source point cloud;
   collecting multiple registration results in which a registration error between a source point cloud and a target point cloud is a local minimum as candidates; and selecting a registration result in which the registration error between the source point cloud and the target point cloud is a global minimum, among the candidates, and collecting the multiple registration results comprises repeatedly performing initializing the source point cloud and the target point cloud based on one of the multiple first transformation matrices; and registering the initialized source point cloud to the initialized target point cloud, thereby searching for a registration result in which a registration error is a local minimum.

2. The apparatus of claim 1, wherein the source point cloud and the target point cloud are configured such that a center of points included in the source point cloud and a center of points included in the target point cloud are moved to an origin point.

3. The apparatus of claim 2, wherein the target point cloud is generated as a multi-dimensional tree (KD-tree).

4. The apparatus of claim 1, wherein:

searching for the registration result includes matching at least one point in the target point cloud to a point closest thereto in the source point cloud;

performing rigid transformation of the source point cloud based on the matched closest points; and calculating a registration error between the target point cloud and the source point cloud on which rigid transformation is performed, matching the closest points, performing the rigid transformation, and calculating the registration error are repeatedly performed until the registration error converges to a local minimum, and a second transformation matrix by which the registration error converges to the local minimum is added to the candidates.

5. The apparatus of claim 4, wherein:

collecting the multiple registration results is repeatedly performed depending on whether predetermined conditions for termination are satisfied, and whether the predetermined conditions for termination are satisfied is determined depending on whether a termination condition, calculated by setting a difference between a maximum value and a mean value of degrees of matching as a multiple of a variance, is equal to or greater than a predetermined threshold after calculating the degrees of matching between the source point cloud and the target point cloud registered by respective multiple second transformation matrices.

6. The apparatus of claim 5, wherein:

the degrees of matching are calculated by applying a number of matching points between the source point cloud and the target point cloud to a mean of distances between the matching points as a weight.

7. The apparatus of claim 5, wherein:

whether the predetermined conditions for termination are satisfied is determined when three or more second transformation matrices are collected.

8. A method for searching for a global minimum of a point cloud registration error, comprising:

segmenting each of the target point cloud and the source point cloud into predetermined voxel units;

calculating normal vectors for respective voxels;

calculating multiple first transformation matrices for randomly matching normal vectors of the target point cloud to respective normal vectors of the source point cloud;

collecting multiple registration results in which a registration error between a source point cloud and a target point cloud is a local minimum as candidates; and selecting a registration result in which the registration error between the source point cloud and the target point cloud is a global minimum, among the candidates, wherein collecting the multiple registration results comprises repeatedly performing initializing the source point cloud and the target point cloud based on one of the multiple first transformation matrices; and registering the initialized source point cloud to the initialized target point cloud, thereby searching for a registration result in which a registration error is a local minimum.

9. The method of claim 8, wherein the source point cloud and the target point cloud are configured such that a center of points included in the source point cloud and a center of points included in the target point cloud are moved to an origin point.

10. The method of claim 9, wherein the target point cloud is generated as a multi-dimensional tree (KD-tree).

11. The method of claim 8, wherein:

searching for the registration result includes matching at least one point in the target point cloud to a point closest thereto in the source point cloud;

performing rigid transformation of the source point cloud based on the matched closest points; and calculating a registration error between the target point cloud and the source point cloud on which rigid transformation is performed, matching the closest points, performing the rigid transformation, and calculating the registration error are repeatedly performed until the registration error converges to a local minimum, and a second transformation matrix by which the registration error converges to the local minimum is added to the candidates.

12. The method of claim 11, wherein:

collecting the multiple registration results is repeatedly performed depending on whether predetermined conditions for termination are satisfied, and whether the predetermined conditions for termination are satisfied is determined depending on whether a termination condition, calculated by setting a difference between a maximum value and a mean value of degrees of matching as a multiple of a variance, is equal to or greater than a predetermined threshold after calculating the degrees of matching between the source point cloud and the target point cloud registered by respective multiple second transformation matrices.

13. The method of claim 12, wherein:

the degrees of matching are calculated by applying a number of matching points between the source point cloud and the target point cloud to a mean of distances between the matching points as a weight.

14. The method of claim 12, wherein:

whether the predetermined conditions for termination are satisfied is determined when three or more second transformation matrices are collected.

15. A method for searching for a global minimum of a point cloud registration error, comprising:

calculating multiple first transformation matrices for randomly transforming a source point cloud and a target point cloud;

initializing the source point cloud and the target point cloud based on a first one of the multiple first transformation matrices;
searching for a first registration result that makes a registration error between the initialized source point cloud and the initialized target point cloud converge to a local minimum;
adding the found first registration result to candidates;
initializing the source point cloud and the target point cloud based on a second one of the multiple first transformation matrices;
searching for a second registration result that makes a registration error between the initialized source point cloud and the initialized target point cloud converge to a local minimum;
adding the found second registration result to the candidates;
initializing the source point cloud and the target point cloud based on a third one of the multiple first transformation matrices;
searching for a third registration result that makes a registration error between the initialized source point cloud and the initialized target point cloud converge to a local minimum;
adding the found third registration result to the candidates; and
returning to initializing the source point cloud and the target point cloud based on a fourth one of the multiple first transformation matrices or selecting a registration result in which a registration error between the source point cloud and the target point cloud is a global minimum, among the candidates, depending on whether predetermined conditions for termination are satisfied,
wherein calculating the multiple first transformation matrices includes
segmenting each of the target point cloud and the source point cloud into predetermined voxel units;
calculating normal vectors for respective voxels; and
calculating multiple first transformation matrices for matching normal vectors of the target point cloud to respective normal vectors of the source point cloud.

16. The method of claim 15, wherein
whether the predetermined conditions for termination are satisfied is determined depending on whether a termination condition, calculated by setting a difference between a maximum value and a mean value of degrees of matching as a multiple of a variance, is equal to or greater than a predetermined threshold after calculating the degrees of matching between the source point cloud and the target point cloud registered by the respective multiple second transformation matrices.

17. The method of claim 16, wherein:
the degrees of matching are calculated by applying a number of matching points between the source point cloud and the target point cloud to a mean of distances between the matching points as a weight.

* * * * *